US007001586B2

(12) United States Patent
Wang et al.

(10) Patent No.: US 7,001,586 B2
(45) Date of Patent: Feb. 21, 2006

(54) CO-FREE HYDROGEN FROM DECOMPOSITION OF METHANE

(75) Inventors: Haiyou Wang, Westboro, MA (US); R. Terry K. Baker, Hopkinton, MA (US)

(73) Assignee: Catalytic Materials, LLC, Holliston, MA (US)

( * ) Notice: Subject to any disclaimer, the term of this patent is extended or adjusted under 35 U.S.C. 154(b) by 1 day.

(21) Appl. No.: 10/669,956

(22) Filed: Sep. 23, 2003

(65) Prior Publication Data

US 2005/0063900 A1 Mar. 24, 2005

(51) Int. Cl.
*C01B 3/24* (2006.01)
*C01B 3/26* (2006.01)
*B01J 23/58* (2006.01)
*B01J 23/72* (2006.01)
*B01J 23/00* (2006.01)

(52) U.S. Cl. ............... 423/650; 423/651; 252/373; 502/328; 502/331; 502/337

(58) Field of Classification Search ............ 502/301, 502/326, 328, 331, 337, 340, 345; 252/373; 423/650, 651
See application file for complete search history.

(56) References Cited

U.S. PATENT DOCUMENTS

| | | | | |
|---|---|---|---|---|
| 3,363,988 A | * | 1/1968 | Hayes ..................... 423/651 |
| 3,674,710 A | * | 7/1972 | Richter et al. ............. 502/301 |
| 3,862,911 A | * | 1/1975 | Chabert .................... 502/301 |
| 3,988,425 A | * | 10/1976 | Jockel et al. ............ 423/418.2 |
| 4,337,028 A | * | 6/1982 | Angwin et al. ................ 431/7 |
| 4,337,178 A | * | 6/1982 | Atwood et al. ............. 502/328 |
| 4,380,673 A | * | 4/1983 | Bournonville et al. ...... 568/361 |
| 4,628,130 A | * | 12/1986 | Bournonville et al. ...... 568/885 |
| 4,800,139 A | * | 1/1989 | Kenjyo ..................... 429/42 |
| 5,498,587 A | * | 3/1996 | Deckers et al. ............. 502/328 |
| 5,536,694 A | * | 7/1996 | Schuetz et al. ............. 502/301 |
| 5,595,719 A | * | 1/1997 | Ul-Haque et al. ....... 423/418.2 |
| 5,741,440 A | * | 4/1998 | Cooper et al. .............. 252/373 |
| 5,756,421 A | * | 5/1998 | Choudhary et al. ......... 502/328 |
| 5,767,040 A | * | 6/1998 | Bhattacharyya et al. . 423/594.3 |
| 6,113,871 A | * | 9/2000 | Schafer et al. ............. 423/239.1 |
| 6,121,188 A | * | 9/2000 | Breitscheidel et al. ...... 502/301 |
| 6,156,694 A | * | 12/2000 | Harper ..................... 502/301 |
| 6,242,380 B1 | * | 6/2001 | Park et al. .................. 502/337 |
| 6,261,991 B1 | * | 7/2001 | Numaguchi et al. ........ 502/337 |
| 6,284,703 B1 | * | 9/2001 | Ostgard et al. ............. 502/301 |
| 6,293,979 B1 | | 9/2001 | Choudhary et al. |
| 6,368,996 B1 | * | 4/2002 | Mu et al. ................... 502/301 |
| 6,395,197 B1 | | 5/2002 | Detering et al. |
| 6,436,354 B1 | | 8/2002 | Priegnitz et al. |
| 6,436,871 B1 | * | 8/2002 | Liu .......................... 502/335 |
| 6,509,000 B1 | | 1/2003 | Choudhary et al. |
| 6,573,213 B1 | * | 6/2003 | Ostgard et al. ............. 502/301 |
| 6,677,281 B1 | * | 1/2004 | Givens et al. .............. 508/185 |
| 6,680,280 B1 | * | 1/2004 | Birke et al. ................. 502/337 |
| 6,693,060 B1 | * | 2/2004 | Park et al. .................. 502/337 |
| 6,777,371 B1 | * | 8/2004 | Liu .......................... 502/337 |
| 2002/0007594 A1 | | 1/2002 | Muradov |
| 2002/0151604 A1 | | 10/2002 | Detering et al. |

OTHER PUBLICATIONS

P. Chen, H.-B., Zhang, G.-D. Lin, Q. Hong and K.R. Tsai "Growth of Carbon Nanotubes by Catalytic Decomposition of CH4 or CO on A Ni-MgO Catalyst", Carbon vol. 35, No. 10-11, pp. 1495-1501, Great Britain, 1997.
Sakae Takenaka, Hitoshi Ogihara, Ichiro Yamanaka, Kiyoshi Otsuka, "Decomposition of methane over supported-Ni catalysts: effects of the supports on the catalytic lifetime", Applied Catalysis A: General 217 (2001) pp. 101-110.
M.A. Ermakova, D. Yu. Ermakov, G.G. Kuvshinov, and L.M. Plyasova, "New Nickel Catalysts for the Formation of Filamentous Carbon in the reaction of Methane Decomposition", Journal of Catalysis 187, pp. 77-84 (1999).
M.A. Ermakova, D. Yu. Ermakov, G.G. Kushinov, "Effective catalysts for direct cracking of methane to produce hydrogen and filamentous carbon", Applied Catalysis A: General 201 (2000) pp. 61-70.
B. Monnerat, L. Kiwi-Minsker, A. Renken, "Hydrogen production by catalytic cracking of methane over nickel gauze under periodic reactor operation", Chemical Engineering Science 56 (2001) pp. 633-639.
Nazim Muradov, "Hydrogen via methane decomposition: an application for decarbonization of fossil fuels", International Journal of Hydrogen Energy 26 (2001) pp. 1165-1175.
M.A. Ermakova, D. Yu. Ermakov, "Ni/Si02 and Fe/Si02 catalysts for production of hydrogen and filamentous carbon via methane decomposition", Catalysis Today 77 (2002) pp. 225-235.
Bjorn Gaudernack and Steinar Lynum, "Hydrogen from Natural Gas without Release of C02 to the Atmosphere", Int. J. Hydrogen Energy, vol. 23, No. 12, pp. 1087-1093, 1998.
T.V. Choudhary, C. Sivadinarayana, C.C. Chusuei, A. Klinghoffer, and D. W. Goodman, "Hydrogen Production via Catalytic Decomposition of Methane", Journal of Catalysis 199, pp. 9-18 (2001).
M. G. Poirier and C. Sapundzhiev,"Catalytic Decomposition of Natural Gas to Hydrogen for Fuel Cell Applications", Int. J. Hydrogen Energy, vol. 22, No. 4, pp. 429-433, 1997.

(Continued)

Primary Examiner—Cam N. Nguyen
(74) Attorney, Agent, or Firm—Kean, Miller, Hawthorne, D'Armond, McCowan & Jarman, L.L.P.

(57) ABSTRACT

The generation of CO-free hydrogen from methane, with use of catalyst compositions represented by $Ni_xMg_yO$ and $Ni_xMg_yCu_zO$.

13 Claims, No Drawings

OTHER PUBLICATIONS

Rita Aiello, Jeffrey E. Fiscus, Hans-Conrad zur Loye, Michael D. Amiridis, "Hydrogen production via the direct cracking of methane over Ni/SiO2: catalyst deactivation and regeneration", Applied Catalysis A: General 192 (2000) pp. 227-234.

Lingyu Piao, Yongdan Li, Jiuling Chen, Liu Chang, Jerry Y.S. Lin, "Methane decomposition to carbon nanotubes and hydrogen on an alumina supported nickel aerogel catalyst", Catalysis Today 74 (2002) pp. 145-155.

T. Ishihara, A. Kawahara, A. Fukunaga, H. Nishiguchi, H. Shinkai, M. Miyaki, and Y. Takita, "CH4 Decomposition with a Pd-Ag Hydrogen-Permeating Membrane Reactor for Hydrogen Production at Decreased Temperature", Ind. Eng. Chem. Res. 2002, 41, pp. 3365-3369.

V. R. Choudhary, S. Banerjee, and A. M. Rajput, Continuous Production of H2 at Low Temperature from Methane Decomposition over Ni-Containing Catalyst Followed by Gasification by Steam of the Carbon on the Catalyst in Two Parallel Reactors Operated in Cyclic Manner, Journal of Catalysts 198, 136-141.

Naresh Shah, Devadas Panjala, and Gerald P. Huffman, "Hydrogen Production by Catalytic Decomposition of Methane", Energy & Fuels 2001, 15, pp. 1528-1534.

Zongquan Li, Jiuling Chen, Xixiang Zhang, Yongdan Li, Kwok Kwong Fung, "Catalytic synthesized carbon nanostructures from methane using nanocrystalline Ni", Carbon 40 (2002), pp. 409-415.

Tiejun Zhang, Michael D. Amiridis, "Hydrogen production via the direct cracking of methane over silica-supported nickel catalysts", Applied Catalysis A: General 167 (1998) pp. 161-172.

Yongdan Li, Jiuling Chen, Yongning Qin, and Liu Chang, "Simultaneous Production of Hydrogen and Nanocarbon from Decomposition of Methane on a Nickel-Based Catalyst", Energy & Fuels 2000, 14, pp. 1188-1194.

* cited by examiner

CO-FREE HYDROGEN FROM DECOMPOSITION OF METHANE

FIELD OF THE INVENTION

The present invention relates to the generation of CO-free hydrogen from methane, with use of catalyst compositions represented by $Ni_xMg_yO$ and $Ni_xMg_yCu_zO$.

BACKGROUND OF THE INVENTION

The demand for hydrogen is ever increasing because of its use in various hydro-treating processes in the petroleum industry and also for its use in PEM fuel cells. Since hydrogen is a non-polluting fuel, its use as a fuel, particularly for fuel cells has been rapidly increasing. Hydrogen is a clean fuel in the sense that no $CO_2$ is emitted during the electro-chemical conversion to water. Also, hydrogen produced via the direct cracking of methane is free of CO, which is a poison for Pt-containing catalysts. As a consequence, hydrogen generated via such a process can be used directly in a fuel cell.

Most of the hydrogen produced from methane is produced via the steam reforming process, which consists of three main steps: (a) synthesis gas generation, (b) water-gas shift reaction, and (c) gas purification (CO and $CO_2$ removal). In order to attain the maximum conversion of methane, the process generally employs a steam/carbon ratio of about 3 to 5, a process temperature of about 800–900° C., and pressures from about 30 to 35 atmospheres. The total $CO_2$ emission from steam reforming reaches up to about 0.35 to 0.42 m³ per each m³ of hydrogen produced. Furthermore, for certain applications, such as for PEM fuel cell technology, additional purification steps are necessary. In this regard, it is essential to reduce the carbon oxide concentration to only a few wppm, or less, in order to prevent poisoning of the Pt electro-catalyst.

Thermal decomposition is another method that can be used for producing substantially $CO_2$-free hydrogen from natural gas:

$$CH_4 \rightarrow C + 2H_2 \quad \Delta H^0 = 75.6 \text{ kJ/mol}$$

The methane decomposition reaction is a moderately endothermic process. The energy requirement per mol of hydrogen produced (37.8 kJ/mol) is considerably less than that for the steam reforming process (63.3 kJ/mol $H_2$). In contrast to steam reforming, hydrogen produced from methane by thermal decomposition does not involve a water-gas shift reaction $CO_2$ removal steps, which significantly simplifies the process. In addition to CO-free hydrogen as the major product, the process produces high-purity carbon as a by-product.

Thermal decomposition of natural gas has been used for decades for the production of carbon black with hydrogen being a supplementary fuel for the process (Thermal Black Process). Such a process has been practiced in a semi-continuous fashion using two tandem reactors at high operational temperatures (about 1400° C.). Attempts have been made to reduce the maximum temperature of the decomposition of methane via the use of catalysts. Data on the catalytic decomposition of methane using Co, Cr, Fe, Ni, Pt, Pd, and Rh-based catalysts have been reported in the literature, such as by M. A. Ernaakova et al., Journal of Catalysis, Volume 201, page 183, 2001, which is incorporated herein by reference. Among all the catalysts investigated, nickel appears to provide the highest activity and is most commonly used for this purpose.

A two-step process, in which the catalytic decomposition of methane was firstly carried out followed by regeneration of the deactivated catalyst with $O_2$, $CO_2$ or $H_2O$, has been suggested for the generation of hydrogen by Choudhary et al., Journal of Catalysis, Volume 192, page 316, 2000. In this approach, the deposited carbon, a valuable by-product, was burned off as CO and/or $CO_2$. Consequently, such a method does not offer any significant advantages over that of conventional steam reforming, because of the large emissions of carbon oxides. Furthermore, the catalyst needs to be reduced again prior to the next cycle and its use is limited due to the irreversible transformation of metallic particles that occurs during regeneration and reaction steps.

Direct catalyzed decomposition of methane offers two major advantages over the thermal route: (i) the operational temperature can be dramatically lowered from about 1400° C. to about 550° C., thus requiring less energy input for the process, and (ii) various catalytically-engineered carbon nano-structures of high value can also be generated by the judicious choice of catalysts, thus rendering the process more financially attractive. The large amount of natural gas available makes the catalytic decomposition of methane to produce hydrogen and high value carbon nano-structures commercially feasible.

In order for the direct catalyzed decomposition of methane to be of practical significance it is essential to have a highly effective catalyst for such a process, which heretofore has been unavailable. Such a catalyst should exhibit high activity for a prolonged period of time and continue to function in the presence of large amounts of accumulated carbon. Catalytic decomposition of methane is, however, a rather capricious process due to the exacting requirement for a critical metal particle size and the tendency of the reaction conditions to exert a detrimental influence on catalyst morphology. Previous work has shown that the highest yield of solid carbon was obtained for a catalyst where the average particle size was about 30 to 40 nm. (M. A. Ermakova et al. Catalysis Letters Vol. 62, p. 93 (1999)). XRD analysis indicated that Ni particles were undesirably aggregated as soon as the catalyst came into contact with methane. This particle-sintering behavior resulted in a lowering of the catalytic activity for methane decomposition.

While the concept of generating hydrogen from the catalyzed decomposition of methane has been shown to be a feasible route, there still remains a need for the development of catalysts that can achieve a higher level of performance than those currently available.

SUMMARY OF THE INVENTION

In accordance with the present invention there is provided a method for decomposing methane to hydrogen and carbon and substantially no carbon oxides, which method comprises contacting, at a temperature from about 425° C. to about 625° C., methane with a catalyst represented by the formula:

$Ni_xMg_yO$, wherein x and y reflect the mole content of Ni to Mg respectively, and wherein the molar ratio of Ni to Mg is from about 1 to 1 to about 6.2 to 1, and the percentage of Ni in the metallic state is from about 15% and up to about 95%, and the percentage of Ni, of the metallic Ni, in the active state is greater than about 25%.

Also in accordance with the present invention there is provided a method for decomposing methane to hydrogen and carbon and substantially no carbon oxides, which method comprises contacting, at a temperature from about 500° C. to about 800° C., methane with a catalyst represented by the formula:

is a catalyst composition represented by:

$Ni_xMg_yCu_zO$, wherein x, y, and z represent the mole content of Ni, Mg, and Cu respectively;

the molar ratio of Ni to Cu is about 19 to 1 to about 1 to 1;

the molar ratio of Ni to Mg of about 1.0 to 1 to about 6.2 to 1; and the percentage of Ni and Cu in the metallic state is from about 15% to 95%, and the percentage of Ni, of the metallic sites, in the active state is greater than about 25%.

In a preferred embodiment the molar ratio of Ni to Mg is from about 1.8 to 1 to about 2.8 to 1, In another preferred embodiment the molar ratio of Ni to Cu is from about 9 to 1 to about 7 to 3.

In yet another preferred embodiment the molar ratio of Ni to Cu is about 4 to 1.

In preferred embodiments the solvent is selected from water, alcohols and ethers, with water being the most preferred.

DETAILED DESCRIPTION OF THE INVENTION

The catalysts of the present invention are particularly useful for catalyzing the direct decomposition of methane to hydrogen and carbon without the generation of carbon oxides. Under certain conditions, and with catalysts of the present invention, the carbon is a high value graphitic nanofiber material having various uses, such as its use as a reinforcing agent, its use in fuel cell electrodes, etc. In the broadest sense, the catalysts of the present invention can be represented by $Ni_xMg_yO$, wherein x and y represent the molar amounts of Ni and Mg respectively and wherein the molar ratio of Ni to Mg is from about 1 to 1 to 6.2 to 1, preferably from about 1.8 to 1 to about 2.8 to 1, and more preferably from about 2 to 1 to about 2.8 to 1 and even more preferably from about 2.4 to 1. The percentage of metallic nickel in the catalyst is from about 15% to about 90%, preferably from about 55% to about 80% and more preferable from about 65% to about 75% and most preferably about 70%. An active Ni site, for purposes of the present invention is a reduced Ni atom. Thus, the greater the number of active Ni sites the greater the number of Ni atoms will be in the metallic state. Conventional NiMgO catalysts contain no more than about 25% of their Ni sites being active. It has unexpectedly been found by the inventors herein that they are able to produce NiMgO catalyst compositions with greater than about 25% of the Ni sites being active. The percentage of active sites in catalysts can be measured by conventional analytical techniques, such as a combined temperature programmed reduction and thermal gravimetric analysis.

Another preferred catalyst system of the present invention is one that is represented by the formula: $Ni_xMg_yCu_zO$, wherein x, y, and z represent the mole concentration of Ni, Mg, and Cu respectively, and wherein the molar ratio of Ni to Mg is from about 1 to 1 to 6.2 to 1, preferably from about 1.8 to 1 to about 2.8 to 1, and more preferably from about 2 to 1 to about 2.8 to 1. The molar ratio of Ni to Cu will be from about 19 to 1 to about 1 to 1, preferably from about 9 to 1 to about 7 to 3, and most preferably about 4 to 1. The percentage of metallic Ni and Cu sites in the catalyst is greater than 25% and up to about 95%, preferably from about 50% to about 90% and more preferably from about 70% to about 85% and most preferably from about 80% to about 85%.

One preferred method for preparing the $Ni_xMg_yO$ catalysts of the present invention is to first dissolve a nickel salt in a suitable solvent. The solvent should be one in which the nickel salt is readily soluble, that is, a solvent in which the nickel salt will substantially completely dissolve. Of course, the particular solvent used will depend on the choice of the salt. Non-limiting examples of solvents that can be used for the preparation of the catalyst systems of the present invention include water, alcohols, and ethers, with water and $C_1$ to $C_5$ alcohols being the more preferred and water being the most preferred. The amount of nickel salt used will depend on the desired ratio of Ni to Mg. As previously mentioned the desired molar ratio of Ni to Mg will range from about 1 to 1 to about 6.2 to 1. A suitable amount of a Mg compound, most preferably MgO, in particulate form, or in a slurry of the solvent used to dissolve the Ni-salt, is introduced into the Ni-salt/solvent solution to form a slurry comprised of MgO/Ni-salt solution. The suitable amount of MgO will of course depend on the desired molar ratio of Ni to Mg in the final catalyst product. Non-limiting examples of magnesium containing compounds include MgO, $Mg(OH)_2$, $MgCO_3$. Mg salts (nitrates, acetate, sulfate, chloride, etc.). The most preferred is MgO. Non-limiting examples of nickel salts suitable for use herein include nickel nitrate, nickel chloride, nickel sulfate, nickel acetate, and nickel carbonate.

Another preferred method for the preparation of $Ni_xMg_yO$ and $Ni_xMg_yCu_zO$ catalysts is co-precipitation of aqueous solutions of nickel, copper, if present, and magnesium salts with a basic aqueous solution. Non-limiting examples of nickel, copper and magnesium salts include nitrates, chlorides, sulfates acetates, and carbonates. Non-limiting examples of the basic aqueous solutions include those containing $NH_4OH$, $NaOH$, $KOH$, $Na_2CO_3$ and $K_2CO_3$. The co-precipitated hydroxides or carbonates are left overnight, then washed in distilled water, filtrated and dried at 110° C. in air. The dried powders are then calcined, ground and reduced in a hydrogen-containing atmosphere prior to use.

Another preferred method for preparing catalysts of the present invention is that of the thermal crystallization of a supersaturated solution. This thermal crystallization process can be practiced by the following multi-step procedure:

Step 1: A mixture of a nickel salt, a copper salt and a magnesium salt in the desired ratios is initially dissolved in ethanol to form a homogeneous solution.

Step 2: The solution is then subjected to evaporation to form a concentrated solution with stirring at about room temperature (about 22° C.).

Step 3: The evaporation process is continued as the temperature is raised to about 150° C. while simultaneously stirring until a solid mass of homogeneously mixed salts is obtained.

Step 4: The solid mass of mixed salts is then calcined in flowing air at a suitable calcinations temperature, preferably at about 500° C. for an effective period of time. This effective period of time will typically be from about 2 to 6 hours, preferably from about 3 to 5 hours and more preferably about 4 hours in order to convert the metal salts to metal oxides.

Step 5: The metal oxides are then ground in a suitable grinding device, preferably in a ball mill to form a fine powder.

Step 6: The fine powder is then reduced in a hydrogen-containing atmosphere, most preferably one containing about 10 vol. %, more preferably at least about 25 vol.

% hydrogen with remainder being an inert gas, preferably argon at temperature from about 500° C. to about 1200° C. for in effective amount of time, for example for about 1 hour. These conditions are sufficient to convert at least a portion, preferably substantially all of the nickel and copper oxides to the metallic state whereas the magnesium component remains in the oxide form.

If it is desired to produce a catalyst composition represented by $Ni_xMg_yCu_zO$, then an effective amount of a Cu-salt can be dissolved with the Ni-salt. An effective amount of Cu-salt will be used to result in a catalyst having a Ni to Cu molar ratio of about 19 to 1 to about 1 to 1, preferably from about 9 to 1 to about 7 to 3, and most preferably about 4 to 1.

Solvent is driven off to form a paste, that is, a non-flowing solvent containing moldable mass. Any conventional technique can be used to drive off the solvent. Non-limiting techniques include vigorously stirring at room or elevated temperatures, evaporation, settling and decanting, centrifugation, and filtration. It is preferred to evaporate off a desired amount of solvent to form the paste. The paste is then dried by any suitable method to form a free-flowing substantially solvent free powder. Preferred methods for drying the powder include oven drying at temperatures from about 110° C. to about 130° C., and spray drying. By substantially solvent free, we mean that less than 1 wt. %, preferably less than about 0.5 wt. %, more preferably less than about 0.1 wt. %, and most preferably no solvent will remain with the powder after drying. The powder will be comprised of a mixture of MgO particles, Ni-salt particles, and Cu-salt particles if present. The powder is then calcined under conditions effective to decompose the Ni-salt and Cu-salt if present, but not the MgO. Effective calcining temperatures range from about 350° C. to about 1000° C., preferably from about 350° C. to about 650° C. in an oxidizing environment, preferably in flowing air, for an effective period of time which will typically be from about 2 to 8 hours, preferably from about 4 to 6 hours.

The calcined powder after being ground to a finely divided state is then heated in a reducing environment at suitable chemical reducing temperatures, such as at temperatures from about 500° C. to about 1200° C., for an effective amount of time. A preferred reducing environment is one that includes hydrogen with or without an inert gas, preferably nitrogen. The preferred reducing atmosphere would contain at least about 10 vol. % hydrogen, preferably greater than about 25 vol. % hydrogen.

The resulting catalysts of the present invention will be characterized as having a substantially higher percentage of active Ni sites when compared with conventional NiMgO and NiCuMgO catalysts. Active Ni sites are those Ni sites wherein the Ni atom is in a reduced or metallic state. That is, those Ni atoms that are at the surface of the catalyst and available to react with methane and that are in the bulk of the catalyst and function as a medium for carbon diffusion.

During the calcination step, the $Ni^{2+}$, $Mg^{2+}$ and $Cu^{2+}$, if present as cations, will be converted into metal oxides, while the anions of these salts, e.g. $NO^{3-}$ will be transformed into gaseous products e.g. $NO_2$, and as a consequence, will be released from the catalyst sample.

During the reduction step, all or a certain fraction of nickel and copper if present as oxides will be converted into the respective metallic states. On the other hand, the magnesium species will remain the oxide state.

Catalyzed Decomposition of Methane

It has unexpectedly been found by the inventors hereof that the catalysts of the present invention are capable of producing substantially carbon oxide-free hydrogen and substantially pure carbon by the decomposition of methane over a relatively low temperature range of 475° to 800° C., preferably from about 475° C. to about 700° C., more preferably from about 475° C. to about 650° C., and most preferably from about 500° C. to about 575° C. For catalysts wherein Cu is not present the preferred methane decomposition temperature range is from about 450° to about 625°, preferably from about 475° to about 575°, more preferably from about 500° to about 550°, and most preferably from about 500° to about 525° C. When Cu is present in the catalyst composition of the present invention then the methane decomposition temperature range is preferably from about 500° to 800° C., more preferably from about 600° to 775°, most preferably from about 700° to 760° C., and particularly from about 750° to 760° C. While conventional catalysts of similar composition can only exhibit activity for substantially CO-free hydrogen and substantially pure carbon by the direct decomposition of methane at lower temperatures (typically less than 650° C.). The catalysts of the present invention, which contain a higher level of active Ni-sites are unexpectedly capable of a extending lifetime as well as substantially higher hydrogen and carbon yields even at higher reaction temperatures, e.g. greater than 700° C., when compared with prior art catalysts.

The methane flow rate can range from about 30 to 180 ml/min; however, if one desires to obtain a high yield of hydrogen/hour then a flow rate of about 120 ml/min is the most preferable flow rate.

It is within the scope of this invention that natural gas be used in place of or as a mixture with methane for the production of hydrogen and carbon. The presence of ethane and other $C_3$ to $C_6$ hydrocarbons in natural gas will not lead to the production of CO, or $CO_2$. They may, however, exert a minor effect on the lifetime of the catalyst since they undergo decomposition in a more facile manner than methane and this feature could give rise to premature deactivation of the catalyst. It should be stressed, however, that these impurities are generally present in very low concentrations (typically about 2 mole % and less) in natural gas and are unlikely to cause major perturbations in the behavior of the catalyst compared to that observed with pure methane feed.

The Ni and Cu components in the catalyst will typically contain a thin layer of metal oxide coating resulting from exposure to air. Therefore, before the catalyst is used for methane decomposition, the thin oxide layer will need to be removed, preferably by heating in hydrogen. If the catalyst is used in the methane decomposition reaction without first removing the oxide layer decomposition to solid carbon and hydrogen will not be achieved. As a consequence, the catalyst will not be in the correct state to perform its desired role. The catalyst will preferably be used in a powdered form and having an average particle size less than about 40 nm. When the catalyst is in the desired state, preferably one represented by $Ni_xMg_yCu_zO$, higher yields of CO-free hydrogen and pure carbon nanofibers can be achieved by the practice of the present invention when compared with what can be achieved by conventional methods.

The carbon produced by methane decomposition of the present invention is preferably a graphitic nanofiber that can be characterized as having a unique set of properties that include: (i) a surface area from about 20 to 3,000 $m^2/g$, preferably from about 50 to 800 $m^2/g$, more preferably from about 100 to 700 $m^2/g$, and most preferably from about 250 to 350 m$^2$/g, which surface area is determined by N$_2$ adsorption at −196° C.; (ii) a crystallinity from about 5% to about 100%, preferably from about 50% to 100%, more preferably from about 75% to 100%, most preferably from about 90% to 100%, and ideally substantially 100%; and (iii) interstices of about 0.335 nm to about 0.40 nm, preferably about 0.335 nm. The interstices are the distance between the graphite platelets. It is also preferred that the carbon nanofibers produced during methane decomposition have at least about 5%, preferably at least about 50%, more preferably at least about 80%, and most preferably at least about 95% of the edge sites exposed.

The present invention will be illustrated in more detail with reference to the following examples, which should not be construed to be limiting in scope of the present invention.

EXAMPLES

Experimental Procedure

The decomposition of methane was carried out in a quartz flow reactor heated by a Lindberg horizontal tube furnace. The gas flow to the reactor was precisely monitored and regulated by the use of MKS mass flow controllers allowing a constant composition of feed to be delivered. Powdered catalyst samples (50 mg) were placed in a ceramic boat at the center of the reactor tube in the furnace and the system flushed with argon for 0.5 hours. After reduction of the sample in a 10% H$_2$/Ar mixture at a temperature between 500° and 1000° C., the system was once again flushed with argon and methane was introduced into then reactor and allowed to react with the catalyst at a predetermined temperature under atmospheric pressure conditions. The progress of the reaction was followed as a function of time by sampling both the inlet and outlet gas streams at regular intervals and analyzing the reactants and products by gas chromatography. The total amount of solid carbon deposited during the time on stream was determined gravimetrically after the system had been cooled to room temperature.

Example 1

In this series of experiments the effect of the composition of the NiMgO catalyst on the yields of hydrogen and solid carbon products obtained from the decomposition of methane was investigated. All the Ni$_x$Mg$_y$O catalyst powders were initially calcined at 500° C. in air and reduced at 850° C. in 10% H$_2$/Ar prior to reaction with methane (60 ml/min) at 550° C. Each reaction was carried out up to the point at which complete deactivation of the catalyst occurred. From the data presented in Table 1 it is evident that the highest yields of hydrogen and the solid carbon product were obtained from a catalyst powder having a Ni to Mg molar ratio of 2.4:1, i.e. 78% Ni.

TABLE 1

| x:y (mole ratio) | Hydrogen Yield[a] (L-H$_2$/g-Cat) | Solid Carbon Yield[a] (g-C/g-Cat) |
| --- | --- | --- |
| 0.6 | 70 | 19 |
| 1.0 | 147 | 39 |
| 1.3 | 347 | 93 |
| 1.8 | 477 | 128 |
| 2.0 | 513 | 138 |
| 2.4 | 616 | 165 |

TABLE 1-continued

| x:y (mole ratio) | Hydrogen Yield[a] (L-H$_2$/g-Cat) | Solid Carbon Yield[a] (g-C/g-Cat) |
| --- | --- | --- |
| 2.8 | 504 | 135 |
| 3.6 | 426 | 114 |

[a]Yields were calculated based on the weight of catalyst before reduction

Example 2

In a second set of experiments the calcination temperature of the mixed metal oxide catalyst 78% NiO—MgO was maintained constant at 500° C. while the reduction temperature was varied over the range of 600° to 1000° C. These catalysts were then reacted in 60 ml/min methane at 550° C. for periods of time until conversion of the hydrocarbon dropped to less than 4%. The yields of hydrogen and solid carbon are given in Table 2. From these data it is evident that the highest amounts of products were obtained from catalysts prepared from mixed metal oxides that were reduced at temperatures between 850° and 950° C.

TABLE 2

| Reduction Temperature (° C.) | % CH$_4$ Conversion[a] | Lifetime (hours) | Hydrogen Yield[b] (L-H$_2$/g-Cat) | Solid Carbon Yield[b] (g-C/g-Cat) | Ni$^0$ content (%) |
| --- | --- | --- | --- | --- | --- |
| 600 | 17.1 | 12 | 201 | 54 | 14.5 |
| 750 | 18.1 | 21 | 386 | 103 | 56.9 |
| 850 | 17.2 | 30 | 616 | 165 | 69.3 |
| 950 | 17.6 | 31 | 607 | 162 | 74.0 |
| 1000 | 15.1 | 14 | 213 | 57 | 78.0 |

[a]data obtained after 1.0 hours.
[b]Yields were calculated based on the weight of catalyst before reduction.

Example 3

In this series of experiments the reduction temperature of the mixed metal oxide catalyst 78% NiO—MgO was maintained constant at 850° C. while the calcination temperature was varied over the range 350 to 900° C. These catalysts were then reacted in 60 ml/min methane at 550° C. for periods of time until conversion of the hydrocarbon dropped to less than 4%. From the data presented in Table 3 it is evident that as the calcination temperature is progressively increased there is a concomitant decrease in the yields of hydrogen and the solid carbon product. It should be stressed that the calcination temperature should be higher than 280° C., the decomposition temperature of Ni(NO$_3$)$_2$.6H$_2$O, the nickel salt used in the catalyst preparation. The preferred calcination temperature range is between 280° and 1100° C., the more preferred range is about 280° to 800° C. and the most preferred range is about 280° to 500° C.

TABLE 3

| Calcination Temperature (° C.) | % CH$_4$ Conversion[a] | Lifetime (hours) | Hydrogen Yield[b] (L-H$_2$/g-Cat) | Solid Carbon Yield[b] (g-C/g-Cat) |
| --- | --- | --- | --- | --- |
| 350 | 17.7 | 33 | 625 | 167 |
| 500 | 17.2 | 30 | 616 | 165 |
| 650 | 18.1 | 28 | 558 | 149 |

TABLE 3-continued

| Calcination Temperature (° C.) | % CH$_4$ Conversion [a] | Lifetime (hours) | Hydrogen Yield[b] (L-H$_2$/g-Cat) | Solid Carbon Yield[b] (g-C/g-Cat) |
|---|---|---|---|---|
| 800 | 17.6 | 21 | 422 | 113 |
| 900 | 17.1 | 14 | 295 | 79 |

[a] data obtained after 1.0 hours
[b] Yields were calculated based on the weight of catalyst before reduction Example 4

In this set of experiments a comparison of the performance for methane decomposition at 550° C. of various mixed oxide catalysts containing the same weight of nickel was carried out. Each catalyst system was calcined in air at 500° C. and then reduced in flowing 10% H$_2$/Ar at 850° C. The methane decomposition reactions were conducted in 60 ml/min methane for periods of time until conversion of the hydrocarbon dropped to less than 4%. Inspection of the data presented in Table 4 clearly shows that the type of interaction exhibited by Ni with a particular oxide is a critical factor in determining the activity of the catalyst. A catalyst based on Ni and MgO is an order of magnitude more active than Ni and SiO$_2$, whereas Ni mixed with CaO (an alkaline earth oxide like MgO) does not display any activity for methane decomposition.

TABLE 4

| Catalyst | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 78% Ni—SiO$_2$ | 11.4 | 6 | 69 | 18 |
| 78% Ni—MgO | 17.2 | 30 | 743 | 199 |
| 78% Ni—CaO | 0.4 | <1 | 0 | 0 |

[a] data obtained after 1 hour
[b] Yields were calculated based on the weight of catalyst after reduction Example 5

In a further set of experiments, the effect of reaction temperature on the catalytic activity of 78% Ni—MgO for the decomposition of methane was investigated. The powdered catalyst was initially calcined at 500° C., reduced at 850° C. and then reacted in 60 ml/min of methane at temperatures over the range 500° to 625° C. Reactions were allowed to continue until the hydrocarbon conversion level dropped to below 4%. Examination of the results presented in Table 5 indicates that whilst the catalyst exhibits high activity over the temperature range 500° to 575° C., the optimum conditions occur at a reaction temperature of 525° C.

TABLE 5

| Reaction Temperature (° C.) | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 475 | 6.7 | 88 | 740 | 198 |
| 500 | 10.2 | 74 | 990 | 265 |
| 525 | 13.8 | 52 | 976 | 262 |
| 550 | 17.2 | 30 | 743 | 199 |
| 575 | 24.4 | 17 | 533 | 143 |
| 625 | 3.1 | <1 | 10 | 3 |

[a] data obtained after 1 hour
[b] Yields were calculated based on the weight of catalyst after reduction Example 6

In this series of experiments the influence of adding a small amount of a third component to the catalyst formulation on the decomposition of methane was explored. Catalyst powders were prepared by introducing 8.7 wt. % of copper, cobalt or iron, respectively into the 78% Ni—MgO system. These powders were then calcined at 500° C., followed by reduction at 850° C. and then reacted in 60 ml/min methane at 550° C. In most cases the reactions were conducted for as long as the catalytic activity was maintained at greater than 4%. It is evident from Table 6 that under the reaction conditions employed in this study none of the additives appeared to enhance the catalytic activity of the 78% Ni—MgO system. On the other hand, the addition of copper was unexpectedly found to exert a significant impact on the lifetime of the catalyst system.

TABLE 6

| Additive | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| — | 17.2 | 30 | 743 | 199 |
| Cu | 11.8 | 52 | 597 | 160 |
| Co | 17.0 | 24 | 582 | 156 |
| Fe | 14.6 | 10 | 164 | 44 |

[a] data obtained after 1 hour
[b] Yields were calculated based on the weight of catalyst after reduction Example 7

In this set of experiments the ratio of Ni to Cu was systematically varied in the Ni$_x$Mg$_y$Cu$_z$O (x:y=2.4:1) catalyst. These powders were then calcined at 500° C., reduced at 850° C. and then reacted in 60 ml/min methane at 665° C. In each case, reactions were allowed to continue until the hydrocarbon conversion level dropped to below 4%. Examination of the data presented in Table 7 shows that highest yields of hydrogen and solid carbon product are obtained at an optimal Ni/Cu ratio (while the total Ni/Mg ratio is fixed at 2.4/1). The preferable Ni/Cu ratio is between 19/1 and 1/1 and the most preferable range is between 9/1 and 7/3 and the optimum ratio is 4/1.

TABLE 7

| Ni/Cu Molar ratio | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 49/1 | 1.9 | <1 | 4 | 1 |
| 19/1 | 40.2 | 3 | 101 | 27 |
| 9/1 | 35.6 | 39.0 | 1409 | 378 |
| 17/3 | 33.3 | 43.0 | 1548 | 414 |
| 4/1 | 30.6 | 43.0 | 1594 | 427 |

TABLE 7-continued

| Ni/Cu Molar ratio | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 3/1 | 28.8 | 40.0 | 1403 | 376 |
| 7/3 | 27.1 | 35.0 | 1226 | 328 |
| 1/1 | 23.0 | 28.0 | 739 | 198 |

[a]data obtained after 1.0 hours
[b]Yields were calculated based on the weight of catalyst before reduction Example 8

In this set of experiments the Ni$_x$Mg$_y$Cu$_z$O (x:y=2.4:1) (x:z=9:1) catalyst used in Example 6 was treated in 60 ml/min methane at temperatures ranging from 550° to 700° C. All methane decomposition reactions were allowed to proceed until the catalytic activity had decreased to less than 4% methane conversion. Examination of the data of Table 8 shows that the temperature at which the methane decomposition reaction is performed over this catalyst system is a critical factor for achieving the optimum performance. High activity is realized when the temperature reaction is maintained between 625° and 675° C., with the maximum conversion occurring at 675° C. Increasing the temperature from 675° C. to 700° C. results in a precipitous decline in the performance of this catalyst system.

TABLE 8

| Reaction Temperature (° C.) | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 550 | 11.8 | 52 | 597 | 160 |
| 625 | 25.7 | 53 | 1550 | 415 |
| 650 | 31.6 | 46 | 1748 | 468 |
| 665 | 35.6 | 39 | 1830 | 490 |
| 675 | 37.8 | 32 | 1686 | 452 |
| 700 | 1.3 | <1 | 27 | 7 |

[a]Data obtained after 1.0 hours
[b]Yields were calculated based on the weight of catalyst after reduction Example 9

In this set of experiments the Ni$_x$Mg$_y$Cu$_z$O (x:y=2.4:1) (x:z=4:1) catalyst that was prepared according to the same conditions as that in Example 8 was treated in 60 ml/min methane at temperatures ranging from 665° to 750° C. Examination of the data given in Table 9 shows that the temperature at which the methane decomposition reaction is performed over this catalyst system is a critical factor for achieving the optimum performance. High activity is realized when the temperature reaction is maintained between 665° and 725° C., with the maximum conversion occurring at 725° C. Increasing the temperature from 725° C. to 750° C. resulted in a precipitous decline in the performance of this catalyst system.

TABLE 9

| Reaction Temperature (° C.) | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 665 | 30.6 | 43 | 1594 | 427 |
| 700 | 39.6 | 29 | 1364 | 365 |
| 725 | 44.5 | 18 | 865 | 232 |
| 750 | 0.5 | <1 | 0 | 0 |

[a]data obtained after 1.0 hours
[b]Yields were calculated based on the weight of catalyst before reduction Example 10

In this set of experiments the Ni$_x$Mg$_y$Cu$_z$O (x:y=2.4:1) (x:z=3:1) catalyst that was prepared according to the same conditions as that in Example 8 was treated in 60 ml/min methane at temperatures ranging from 665° to 750° C. Examination of the data given in Table 10 shows that the temperature at which the methane decomposition reaction is performed over this catalyst system is a critical factor for achieving the optimum performance. High activity is realized when the reaction temperature is maintained between 685° and 735° C., with the maximum conversion occurring at 735° C. Increasing the temperature from 735° C. to 750° C. results in a precipitous decline in the performance of this catalyst system.

TABLE 10

| Reaction Temperature (° C.) | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 665 | 28.8 | 40 | 1403 | 376 |
| 685 | 34.3 | 31 | 1347 | 361 |
| 725 | 44.1 | 18 | 921 | 247 |
| 735 | 45.4 | 16 | 846 | 227 |
| 750 | 0.8 | <1 | 0 | 0 |

[a]data obtained after 1.0 hours
[b]Yields were calculated based on the weight of catalyst before reduction Example 11

In this set of experiments the Ni$_x$Mg$_y$Cu$_z$O (x:y=2.4:1) (x:z=7:3) catalyst that was prepared according to the same conditions as that in Example 8 was treated in 60 ml/min methane at temperatures ranging from 665° to 750° C. Examination of the data given in Table 11 shows that the temperature at which the methane decomposition reaction is performed over this catalyst system is a critical factor for achieving the optimum performance. High activity is realized when the reaction temperature is maintained between 725° and 735° C., with the maximum conversion occurring at 735° C. Increasing the temperature from 735° C. to 750° C. results in a precipitous decline in the performance of this catalyst system.

TABLE 11

| Reaction Temperature (° C.) | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 665 | 27.1 | 35 | 1226 | 328 |
| 725 | 41.1 | 18 | 925 | 248 |

TABLE 11-continued

| Reaction Temperature (° C.) | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 735 | 43.0 | 16 | 813 | 218 |
| 750 | 1.0 | <1 | 0 | 0 |

[a]data obtained after 1.0 hours
[b]Yields were calculated based on the weight of catalyst before reduction Comparison of the data presented in Tables 8 to 11 indicates that the Ni$_x$Mg$_y$Cu$_z$O (x:y=2.4:1)(x:z=3:1) catalyst when utilized at 735° C. results in the maximum conversion of methane to hydrogen and solid carbon.

Example 12

In this set of experiments the Ni$_x$Mg$_y$Cu$_z$O (x:y=2.4:1) (x:z=3:1) catalyst was prepared according to the thermal crystallization of a supersaturated solution method. Subsequent calcination and reduction treatments were the same as those described for the catalyst sample used in Example 8. The catalyst was reacted in 60 ml/min methane at temperatures ranging from 665° to 775° C. Examination of the data given in Table 12 shows that the temperature at which the methane decomposition reaction is performed over this catalyst system is a critical factor for achieving optimum performance. High activity is realized when the reaction temperature is maintained between 725° and 760° C., with the maximum conversion occurring at 760° C. Increasing the temperature from 760° C. to 775° C. results in a precipitous decline in the performance of this catalyst system. A comparison of the data presented in Table 12 with that given for the same the same catalyst composition prepared according to the traditional method that includes a carbonate precipitation step reveals major differences in performance (see Table 10). By using the new preparation protocol of the present invention it is possible to generate a catalyst that sustains its activity for the methane conversion of 51.7% at 760° C. The equivalent data for substantially the same catalyst composition, but prepared by a conventional method shows optimum methane conversion of 45.4% at 735° C. (see Table 10).

TABLE 12

| Reaction Temperature (° C.) | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 665 | 28.5 | 38 | 1421 | 381 |
| 725 | 44.3 | 20 | 1031 | 276 |
| 735 | 46.7 | 18 | 942 | 252 |
| 750 | 50.7 | 14 | 740 | 198 |
| 760 | 51.7 | 12 | 636 | 170 |
| 775 | 1.2 | <1 | 0 | 0 |

[a]data obtained after 1.0 hours
[b]Yields were calculated based on the weight of catalyst before reduction Example 13

This set of experiments was conducted with the Ni$_x$Mg$_y$Cu$_z$O (x:y=2.4:1)(x:z=3:1) catalyst that was prepared according to the thermal crystallization of a supersaturated solution method and subsequently treated in the same manner as the sample described in Example 8. The catalyst was reacted for a prolonged period of time in 60 ml/min methane at 750° C. and the hydrocarbon conversion and H$_2$ yield measured at regular intervals. Examination of the data presented in Table 13 shows the initial high activity is maintained for approximately 9 hours and then starts to drop on continued reaction.

TABLE 13

| Reaction Time (hours) | % CH$_4$ Conversion | H$_2$ Concentration (vol %) |
|---|---|---|
| 1 | 50.7 | 67.2 |
| 2 | 49.7 | 66.4 |
| 3 | 49.7 | 66.4 |
| 4 | 49.9 | 66.5 |
| 5 | 50.3 | 66.9 |
| 6 | 50.6 | 67.2 |
| 7 | 50.7 | 67.3 |
| 8 | 50.4 | 67.0 |
| 9 | 49.4 | 66.1 |
| 10 | 47.7 | 64.6 |
| 11 | 44.4 | 61.5 |
| 12 | 37.2 | 54.3 |
| 13 | 17.8 | 30.3 |
| 14 | 4.9 | 9.3 |
| 15 | 4.3 | 8.2 |
| 16 | 4.1 | 7.9 |

Example 14

In this series of experiments the effect of changing the reactant flow rate on the conversion of methane and lifetime of the catalyst was investigated. The Ni$_x$Mg$_y$Cu$_z$O (x:y=2.4:1) (x:z=3:1) catalyst, which was calcined at 500° C., reduced at 850° C. and reacted in methane at 750° C. In these experiments the catalyst was prepared via the thermal crystallization of a supersaturated solution method.

TABLE 14

| % CH$_4$ Flow rate (ml/min) | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|
| 30 | 55.1 | 28 | 800 | 214 |
| 60 | 50.7 | 14 | 740 | 198 |
| 90 | 46.5 | 10 | 778 | 208 |
| 120 | 43.1 | 8 | 797 | 213 |
| 180 | 40.4 | 5.5 | 721 | 193 |

[a]data obtained after 1.0 hours
[b]Yields were calculated based on the weight of catalyst before reduction Inspection of these data clearly indicates that over the range 30 to 120 ml/min the yields of hydrogen do not exhibit any major changes. On the other hand, the optimum methane conversion and catalyst lifetime are realized when the flow rate is maintained at 30 ml/min. As the flow rate is progressively raised so these two parameters show a corresponding decrease.

Example 15

In a further set of experiments we have examined the effect of introducing increasing amounts of hydrogen to the methane on the catalytic activity of the Ni$_x$Mg$_y$Cu$_z$O (x:y=2.4:1) (x:z=9:1) catalyst, which was calcined at 500° C., reduced at 850° C. and reacted in the CH$_4$/H$_2$ mixtures for a period of 5 hours at 665° C. Inspection of the data presented in Table 15 clearly shows that the addition of hydrogen to the reactant gas exerts a negative impact on the activity of the catalyst towards the decomposition of methane.

TABLE 15

| CH$_4$/H$_2$ ratio (ml/ml) | Hydrogen Yield[a] (L-H$_2$/g-Cat) | Solid Carbon Yield[a] (g-C/g-Cat) |
|---|---|---|
| 60/0 | 225 | 60 |
| 55/5 | 204 | 55 |
| 50/10 | 181 | 49 |
| 40/20 | 123 | 33 |

[a]Yields were calculated based on the weight of catalyst before reduction

Example 16

In this set of experiments the effect of systematically increasing the reaction temperature of Ni$_x$Mg$_y$Cu$_z$O (x:y=2.4:1) (x:z=4:1) catalysts, pre-calcined at 500° C. and reduced at various temperatures over the range 500° to 1000° C. was investigated for the conversion of methane. After reduction treatments, the methane decomposition reactions were conducted with 60 ml/min methane for as long as the hydrocarbon conversion level was maintained above 4%. Examination of the data presented in Table 16 shows that the optimum reduction temperature depends on the reaction temperature. When the reaction is carried out at 700° C. or lower, the yields of hydrogen and solid carbon exhibit a progressive increase as the reduction temperature is raised from 600° to 1000° C. When the reaction temperature is equal to or greater than 725° C., the yields of products exhibit maximum values at a reduction temperature of 600° C.

TABLE 16

| Reduction Temperature (° C.) | Reaction Temperature (° C.) | % CH$_4$ Conversion[a] | Lifetime (hours) | Hydrogen Yield[b] (L-H$_2$/g-Cat) | Solid Carbon Yield[b] (g-C/g-Cat) |
|---|---|---|---|---|---|
| 600 | 665 | 30.7 | 33 | 1125 | 301 |
| 850 | 665 | 30.6 | 43 | 1594 | 427 |
| 1000 | 665 | 30.3 | 45 | 1701 | 456 |
| 600 | 700 | 39.7 | 24 | 1159 | 310 |
| 750 | 700 | 39.5 | 25.5 | 1222 | 327 |
| 850 | 700 | 39.6 | 29 | 1364 | 365 |
| 1000 | 700 | 39.0 | 33 | 1566 | 420 |
| 500 | 725 | | | | |
| 600 | 725 | 46.5 | 19 | 980 | 263 |
| 700 | 725 | | | | |
| 850 | 725 | 44.5 | 18 | 865 | 232 |
| 1000 | 725 | 1.1 | <1 | 0 | 0 |
| 600 | 750 | 52.8 | 11 | 625 | 167 |
| 850 | 750 | 0.5 | <1 | 0 | 0 |

What is claimed is:

1. A method for decomposing methane to hydrogen and carbon and substantially no carbon oxides, which method comprises contacting, at a temperature from about 425° C. to about 625° C., methane with a catalyst represented by the formula:

Ni$_x$Mg$_y$O,

Ni$_x$Mg$_y$O, wherein x and y reflect the mole content of Ni to Mg respectively, and wherein the molar ratio of Ni to Mg is from about 1 to 1 to about 6.2 to 1, and the percentage of Ni in the metallic state is from about 15% and up to about 95%, and the percentage of Ni, of the metallic Ni, in the active state is greater than about 25%.

2. The method of claim 1 wherein the molar ratio of Ni to Mg is from about 1.8 to 1 to about 2.8 to 1.

3. The method of claim 2 wherein the molar ratio of Ni to Mg is from about 2.0 to 1 to about 2.8 to 1.

4. The method of claim 1 wherein the percentage of Ni in the metallic state, based on the total amount of Ni is from about 55% to 80%.

5. The method of claim 1 wherein the temperature at which methane decomposition takes place is from about 475° to about 575° C.

6. The method of claim 5 wherein the temperature at which methane decomposition takes place is from about 500° to about 550° C.

7. A method for decomposing methane to hydrogen and carbon and substantially no carbon oxides, which method comprises contacting, at a temperature from about 500° C. to about 800° C., methane with a catalyst represented by the formula:

Ni$_x$Mg$_y$Cu$_z$O, wherein x, y, and z represent the mole content of Ni, Mg, and Cu respectively;
the molar ratio of Ni to Cu is about 19 to 1 to about 1 to 1;
the molar ratio of Ni to Mg of about 1.0 to 1 to about 6.2 to 1; and
the percentage of Ni and Cu in the metallic state is from about 15% to 95%, and the percentage of Ni, of the metallic sites, in the active state is greater than about 25%.

8. The method of claim 7 wherein the molar ratio of Ni to Cu is about 4 to 1.

9. The method of claim 7 wherein the molar ratio of Ni to Mg is from about 1.8 to 1 to 2.8 to 1.

10. The method of claim 9 wherein the molar ratio of Ni to Mg is from about 2.0 to 1 to about 2.8 to 1.

11. The method of claim 7 wherein the percentage of Ni in the metallic state, based on the total amount of Ni is from about 55% to 80%.

12. The method of claim 7 wherein the temperature at which methane decomposition takes place is from about 600° to about 775° C.

13. The method of claim 12 wherein the temperature at which methane decomposition takes place is from about 700° to about 760° C.

* * * * *